Figure 1:
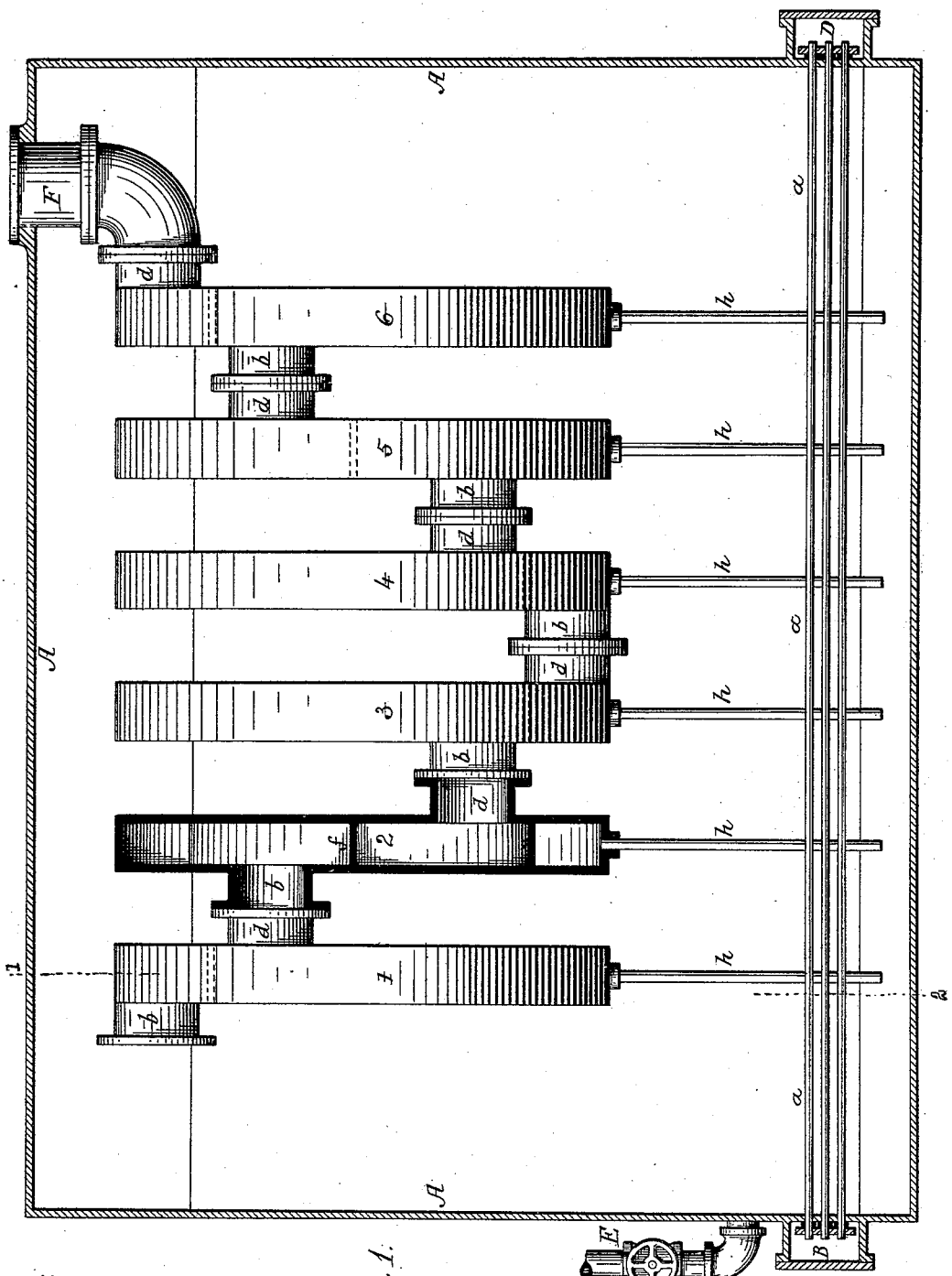

(No Model.)
2 Sheets—Sheet 1.

M. SWENSON.
EVAPORATOR.

No. 457,234. Patented Aug. 4, 1891.

Witnesses:
Murray C. Boyer
Alex. Barkoff

Inventor:
Magnus Swenson
by his Attorneys
Howson & Howson

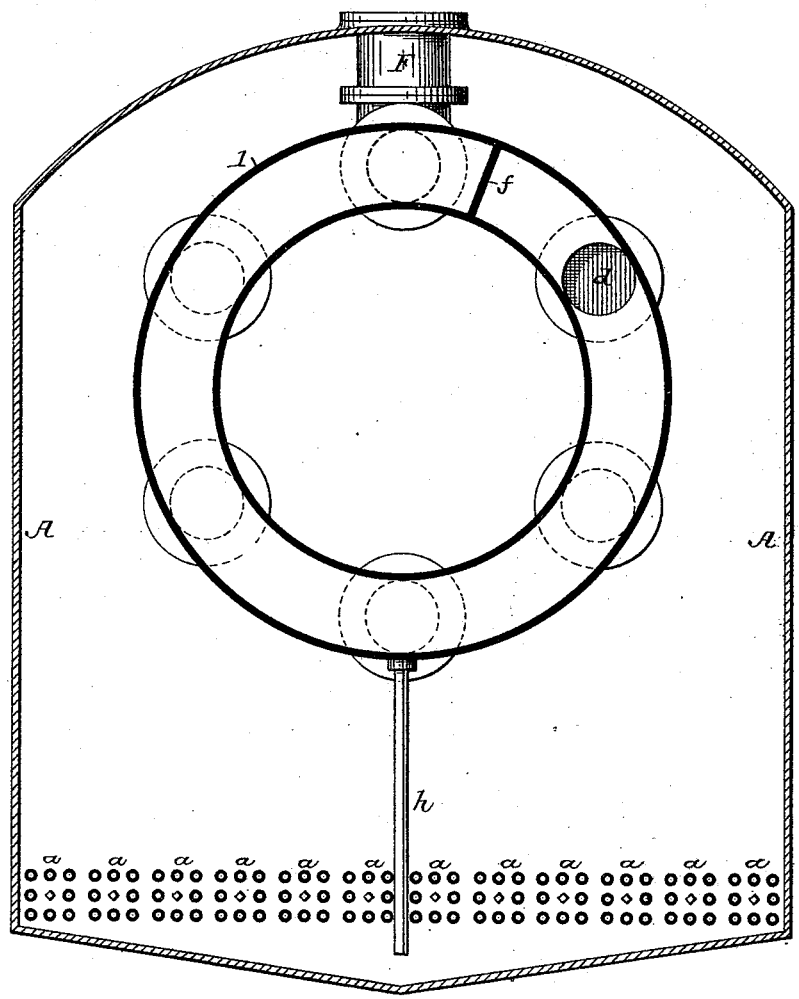

UNITED STATES PATENT OFFICE.

MAGNUS SWENSON, OF FORT SCOTT, KANSAS.

EVAPORATOR.

SPECIFICATION forming part of Letters Patent No. 457,234, dated August 4, 1891.

Application filed August 8, 1890. Serial No. 361,463. (No model.)

*To all whom it may concern:*

Be it known that I, MAGNUS SWENSON, a citizen of the United States, and a resident of Fort Scott, Bourbon county, Kansas, have invented certain Improvements in Evaporators, of which the following is a specification.

My invention relates to evaporators in which the evaporation is effected under vacuum, and especially to evaporators of this class intended for treating liquids which have a tendency to foam in boiling, the object of my invention being to so construct the evaporator as to prevent loss of the liquid due to the escape of this foam from the apparatus with the vapor. This object I attain in the manner hereinafter set forth, reference being had to the accompanying drawings, in which—

Figure 1 is a longitudinal section of an evaporating apparatus constructed in accordance with my invention, and Fig. 2 is a transverse section of the same on the line 1 2, Fig. 1.

A is the outer casing of the apparatus, which may be of any suitable form and dimensions, this casing having in the lower portion a number of sets of longitudinal heating-pipes $a$, each set of pipes communicating with an inlet-chest B at one end of the casing and with an outlet-chest D at the opposite end of the same, so that steam or other heating-fluid can be caused to circulate through these pipes, so as to raise to the boiling-point the liquid which is to be evaporated, said liquid being introduced into the casing through a suitable valved inlet-pipe E and the level of the liquid being maintained above the top of the heating-pipes.

In the upper portion of the casing A are a series of annular drums or hollow rings 1 2 3 4, &c., the first of these drums communicating with the interior of the casing A through an inlet neck or branch $b$ and having an outlet neck or branch $d$, which communicates with the inlet-neck $b$ of the drum 2, the outlet-neck of the latter communicating with the inlet-neck of the drum 3, and so on throughout the series, the outlet-neck of the last drum 6 of the series communicating with a discharge-pipe F, which may communicate with the condenser of the vacuum apparatus, or it may communicate with the inlet-chest B of a second casing if the apparatus is what is known as a "multiple effect" apparatus. The outlet-neck of each of the drums is located in proximity to the inlet-neck of the drum; but on the opposite side of said drum and between the inlet and outlet necks of each drum is a transverse partition $f$, so that vapor entering the drum through the inlet-neck $b$ is compelled to pass around the drum throughout almost or quite its entire extent before it can escape through the inlet-neck $d$ into the next drum of the series or into the discharge-pipe. If the liquid which is being evaporated has a tendency to foam in boiling, the foam will enter the first drum of the series along with the vapor, and as the latter is drawn very rapidly through the series of drums the liquid particles of the foam will by the centrifugal force be caused to seek the outer wall of each drum, on which said liquid will be collected and will flow downward until it finally escapes from the bottom of the drum through a drain-pipe $h$ and is returned to the liquid in the bottom of the casing. By the use of a sufficient number of drums, therefore, the effective separation of all of the liquid particles from the vapor can be effected before the escape of the vapor, or the same effect may be obtained with a less number of drums if the size of the drums is increased so as to present a large peripheral surface for the accumulation of the liquid, or drums connected at the ends, so as to form a continuous coil, spiral or helix, may be employed in lieu of the series of parallel drums shown in the drawings, the drum being coiled around a horizontal axis, so as to provide for tapping the same at a number of points for the reception of the drain-pipes $h$.

Having thus described my invention, I claim and desire to secure by Letters Patent—

1. The combination, in an evaporator, of the outer casing and means for heating the liquid therein, with a separator consisting of a series of annular drums communicating one with another, the first drum of the series communicating with the vapor-chamber of the evaporator and the last drum of the series communicating with the discharge-pipe, and each drum being provided with a drain-pipe, substantially as specified.

2. The combination, in an evaporator, of the casing and means for heating the liquid therein, with the separator consisting of drums, each having an inlet and outlet with interposed partitions, said drums being connected in series, the inlet of the first drum communicating with the vapor-chamber of the evaporator and the outlet of the last drum communicating with the discharge-pipe, and each drum having a drain-pipe communicating with the lower portion of the evaporating-chamber, substantially as specified.

In testimony whereof I have signed my name to this specification in the presence of two subscribing witnesses.

MAGNUS SWENSON.

Witnesses:
B. A. JOHNSTON,
CHAS. S. THOMPSON.